(12) United States Patent
Tonti et al.

(10) Patent No.: US 7,122,606 B2
(45) Date of Patent: Oct. 17, 2006

(54) OLEFIN POLYMERIZATION PROCESS

(75) Inventors: Maria Silvia Tonti, Ferrara (IT); Markus Oberhoff, Speyer (DE); Volker Fraaije, Frankfurt am Main (DE); Bernd Bachmann, Gross-Gerau/Dorn (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/563,497

(22) PCT Filed: Jun. 29, 2004

(86) PCT No.: PCT/EP2004/007061

§ 371 (c)(1),
(2), (4) Date: Jan. 4, 2006

(87) PCT Pub. No.: WO2005/005495

PCT Pub. Date: Jan. 20, 2005

(65) Prior Publication Data

US 2006/0160962 A1  Jul. 20, 2006

Related U.S. Application Data

(60) Provisional application No. 60/486,936, filed on Jul. 14, 2003.

(30) Foreign Application Priority Data

Jul. 4, 2003  (EP) .................................. 03102001

(51) Int. Cl.
*C08F 2/38* (2006.01)

(52) U.S. Cl. ................. 526/64; 526/65; 526/904; 526/905

(58) Field of Classification Search ................. 526/64, 526/65, 904, 905
See application file for complete search history.

(56) References Cited

U.S. PATENT DOCUMENTS

| | | | |
|---|---|---|---|
| 5,145,819 A | 9/1992 | Winter et al. | 502/117 |
| 5,239,022 A | 8/1993 | Winter et al. | 526/127 |
| 5,243,001 A | 9/1993 | Winter et al. | 526/127 |
| 5,324,800 A | 6/1994 | Welborn, Jr. et al. | 526/160 |
| 5,556,928 A | 9/1996 | Devore et al. | 526/127 |
| 5,654,248 A | 8/1997 | Kioka et al. | 502/108 |
| 2003/0008984 A1 | 1/2003 | Kratzer et al. | 526/127 |
| 2003/0013913 A1 | 1/2003 | Schottek et al. | 564/8 |

FOREIGN PATENT DOCUMENTS

| | | |
|---|---|---|
| DE | 19962814 | 6/2001 |
| DE | 19962910 | 7/2001 |
| EP | 0129368 | 12/1984 |
| EP | 0416815 | 3/1991 |
| EP | 0420436 | 4/1991 |
| EP | 0485820 | 5/1992 |
| EP | 0485822 | 5/1992 |
| EP | 0485823 | 5/1992 |
| EP | 0633272 | 1/1995 |
| EP | 0643066 | 3/1995 |
| EP | 0671404 | 9/1995 |
| EP | 0819706 | 1/1998 |
| EP | 1359166 | 11/2003 |
| WO | 9102012 | 2/1991 |
| WO | 9104257 | 4/1991 |
| WO | 9200333 | 1/1992 |
| WO | 9532995 | 12/1995 |
| WO | 9622995 | 8/1996 |
| WO | 9702297 | 1/1997 |
| WO | 9822486 | 5/1998 |
| WO | 9921899 | 5/1999 |
| WO | 9924446 | 5/1999 |
| WO | 9958539 | 11/1999 |
| WO | 0024787 | 5/2000 |
| WO | 0121674 | 3/2001 |
| WO | 0125296 | 4/2001 |
| WO | 0144318 | 6/2001 |
| WO | 0144319 | 6/2001 |
| WO | 0147939 | 7/2001 |
| WO | 0162764 | 8/2001 |
| WO | 0198381 | 12/2001 |
| WO | 03045964 | 6/2003 |

*Primary Examiner*—Fred Teskin
(74) *Attorney, Agent, or Firm*—Jarrod N. Raphael

(57) ABSTRACT

A process for polymerizing one or more alpha-olefins of formula $CH_2=CHT$ wherein T is a hydrogen atom or a $C_1-C_{20}$ alkyl radical comprising the following steps: a) contacting in a continuous way one or more of said alpha olefins with a metallocene based catalyst system in a loop reactor, wherein: (i) the reaction is carried out in a liquid medium; (ii) the average residence time of the metallocene-based catalyst system is not more than 30 minutes; (iii) the temperature of the loop ranges from 25° to 70° C.; in order to obtain a polymerization degree ranging from 60 to 500 g per gram of catalyst system; b) feeding in continuous the prepolymerized metallocene-based catalyst system obtained in step a) into a polymerization reactor C) polymerizing one or more alpha-olefins, the same or different from the alpha olefins used in step a), in the presence of said prepolymerized metallocene-based catalyst system.

18 Claims, 3 Drawing Sheets

OLEFIN POLYMERIZATION PROCESS

Figure 1:
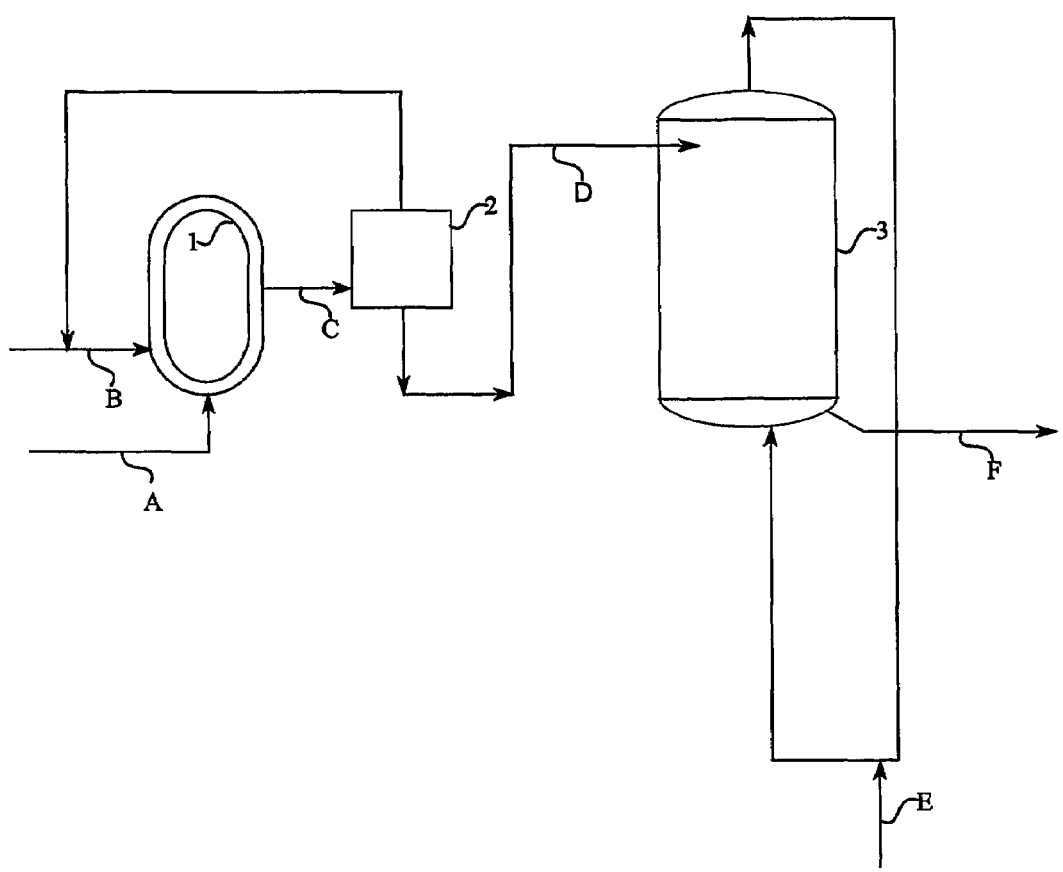

The present application relates to a polymerization process carried out in continuous, in the presence of a metallocene-based catalyst.

Recently, the use of metallocene-based catalyst systems for the polymerization of alpha-olefins has been proposed. Notwithstanding the various advantages, industrial exploitation of those recently developed catalyst systems is being held back by shortcomings associated with them. One of such drawbacks is that, when those catalyst systems are used in an industrial plant, fouling is often observed in the polymerization reactor.

Fouling occurs when polymer particles adhere to the walls and mechanical parts of a polymerization reactor. This results in a number of serious problems detrimental to the polymerization process and to the production of polymer having good particle morphology and bulk density.

A variety of modifications to the metallocene catalyst system have been reported to reduce reactor fouling and/or improve polymer product morphology. Supporting the catalyst system components on a porous carrier and/or prepolymerization of the catalyst system are two such methods.

Generally, it is thought that a prepolymerization treatment reduces occurrence of fouling by preventing early fracture of the supported catalyst system particle Early fracture of the particles is thought to lead to the formation of fines, which may adhere to the reactor wall as a polymeric layer causing the fouling of the reactor. During prepolymerization, a protective shell of polymer is formed primarily around the catalyst-particle which is thought to prevent fracture. It is also thought that this protective shell prevents dissociation of catalyst system components, particularly alumoxane, which otherwise would migrate to reactor surfaces and initiate polymer build-up. In addition, prepolymerization reduces the early catalyst activity rate constant thereby avoiding early overheating by creating a diffusion barrier between the active sites and monomer.

Prepolymerization is generally carried out batchwise, making it difficult to inject the prepolymerized catalyst into the polymerization reactor in an industrial scale without requiring additional reactor equipment, solvents and monomer.

For example, U.S. Pat. No. 5,654,248 describes a prepolymerized metallocene-based catalyst system. In all of the working examples the catalysts is obtained by subjecting a metallocene-based catalyst system to a batchwise prepolymerization, WO 97/02297 relates to a method for forming a prepolymerized supported metallocene catalyst system, said method comprises the step of: prepolymerizing a supported metallocene catalyst system in the presence of olefin monomer wherein the supported catalyst system prior to prepolymerization contains an amount of liquid that is equal to or less than the total pore volume of the supported catalyst system. Also in this case, prepolymerization treatment is carried out batchwise.

The Applicant has found that the prepolymerization treatment can be carried out in a continuous way in a loop reactor under particular conditions, rendering simpler and more cost-effective to feed a prepolymerized metallocene-based catalyst system in an industrial plant and, consequently, allowing a continuous production of polyolefin having excellent morphology characteristic and reducing fouling in the polymerization reactor.

The present invention concerns a process for polymerizing one or more alpha-olefins comprising the following steps:

a) contacting in a continuous way one or more alpha-olefins with a metallocene-based catalyst system in a loop reactor, wherein:
  (i) the reaction is carried out in a liquid medium;
  (ii) the average residence time of the metallocene-based catalyst system is not more than 30 minutes;
  (iii) the temperature ranges from 25 to 70° C.;
  in order to obtain a polymerization degree ranging from 60 to 500 grams per gram of catalyst system;
b) continuously feeding the thus obtained prepolymerized catalyst system into a polymerization reactor;
c) polymerizing one or more alpha-olefins, the same or different from the alpha-olefins used in step a), in the presence of said prepolymerized metallocene-based catalyst system.

According to the process of the invention, the prepolymerization step is carried out in a loop reactor in the presence of a liquid medium (a-i). The liquid alpha-olefin monomer(s) can be used as component of the liquid medium in step a), optionally in the presence of an inert hydrocarbon solvent. Said hydrocarbon solvent can be either aromatic (such as toluene) or aliphatic (such as propane, hexane, heptane, isobutane, cyclohexane and 2,2,4-trimethylpentane). Preferably the prepolymerization is carried out by using one or more of said alpha-olefins in a liquid state as the main component of polymerization medium (bulk polymerization). The amount of hydrocarbon solvent (if any) ranges from 0.1% by weight to 90% by weight with respect to the amount of alpha-olefins, preferably from 10% by weight to 50% by weight.

The prepolymerization step a) is preferably carried out in the presence of hydrogen. When used, the amount of hydrogen present in the loop reactor preferably ranges from 5 to 1000 ppm more preferably from 20 to 500 ppm.

A polymeric slurry containing the prepolymerized metallocene-based catalyst system is obtained at the outlet of the loop reactor after the above indicated residence time. The average residence time (a-ii) is defined as the ratio between the volume of the loop reactor and the volumetric rate of the polymeric slurry discharged from the loop reactor. This parameter can be modified by an increase or a decrease of the output of the polymeric slurry from the loop reactor. It preferably is not more than 20 minutes; more preferably not more than 15 minutes.

The temperature of the loop reactor (a-iii) is the prepolymerization temperature, it ranges preferably from 30° C. to 65° C.; more preferably from 35° C. to 60° C.

The polymerization degree of the prepolymerized metallocene-based catalyst system ranges preferably from 70 to 350 g per gram of catalyst system, more preferably from 100 to 250 g per gram of catalyst system, even more preferably from 100 to 190 g per gram of catalyst system.

It has been proven (see the comparative examples) that a temperature outside the above indicated ranges fail in giving the advantages of the process of the present invention. In fact, the optimum balance of these process parameters (residence time and temperature) together with the use of a loop prepolymerization reactor makes it possible to avoid reactor fouling in the successive polymerization step. A further advantage of the present invention is the optimal morphology of the obtained polymers. Moreover, the continuous process of the invention results much more easy to manage and cost-efficient with respect to the polymerization processes involving a batch pre-polymerization step.

The polymerization step c) can be carried out both in gas-phase and in liquid-phase by using the polymerization reactors known in the art. Therefore, a gas-phase polymerization in a fluidized bed reactor or in a stirred bed reactor, as well as a liquid-phase polymerization in a continuously stirred tank reactor or in a loop reactor are within the scope of the invention. Also, polymerization step c) can be carried out in one or more reactors connected in series. The polymerization step c) is generally carried out at a pressure of between 0.5 and 6 MPa and at a temperature of between 30 and 130° C. Preferably the process according to the present invention is suitable for the homopolymerization or copolymerization of alpha-olefins of formula $CH_2=CHT$ Wherein T is a hydrogen atom or a $C_1-C_{20}$ alkyl radical optionally copolymerized with polyenes. Non-limiting examples of alpha-olefins of formula $CH_2=CHT$ which can be used in the process of the present invention are ethylene, propylene, 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene and 1-eicosene.

The polyenes that can be used as further comonomer in the copolymers according to the present invention are included in the following classes:

non-conjugated diolefins able to cyclopolymerize such as, for example, 1,5-hexadiene, 1-6-heptadiene, 2-methyl-1,5-hexadiene;

dienes capable of giving unsaturated monomeric units, in particular conjugated dienes such as, for example, butadiene and isoprene, and linear non-conjugated dienes, such as, for example, trans 1,4-hexadiene, cis 1,4-hexadiene, 6-methyl-1,5-heptadiene, 3,7-dimethyl-1,6-octadiene, 11-methyl-1,10-dodecadiene, and cyclic non-conjugated dienes such as 5-ethylidene-2-norbornene.

Example of polymers that can be manufactured with the process of the present invention are: high density polyethylene (HDPE), linear low density polyethylene (LLDPE), polypropylene (PP), random copolymers (RACO) of ethylene and propylene, and of ethylene or propylene with other α-olefins, ethylene-propylene rubbers (EPR), ethylene-propylene-diene rubbers (EPDM), heterophasic copolymers (HECO). The process of the present invention is particularly suitable for the homopolymerization or copolymerization of propylene wherein the comonomers are ethylene or alpha olefins of formula $CH_2=CHT^1$ wherein $T^1$ is a $C_2-C_{20}$ alkyl radical and optionally polyenes. Particularly preferred comonomers are ethylene, 1-butene and 1-hexene. In particular with the process of the present invention propylene homopolymer and propylene copolymers containing up to 50% mol of comonomer, preferably up to 20% mol of comonomers can be obtained. Said copolymers can optionally contain units derived from polyenes as described above. The content of polyene derived units, if any, is preferably up to 20 mol % and, more preferably up to 10 mol %.

For the purpose of the present invention with the term metallocene it is intended a transition metal compound containing at least one n bond.

The metallocene-based catalyst system is preferably obtainable by contacting:

a) at least a transition metal compound containing at least one n bond;

b) at least an alumoxane or a compound able to form an alkylmetallocene cation; and c) optionally an organo aluminum compound.

The metallocene-based catalyst can be suitably supported on an inert carrier. This is achieved by depositing the transition metal compound a) or the product of the reaction thereof with the component b), or the component b) and then the transition metal compound a) on an inert support such as, for example, silica, alumina, Al—Si, Al—Mg mixed oxides, porous magnesium halides, such as those described in WO 95/32995, styrene/divinylbenzene copolymers or porous polyolefins, such as polyethylene or polypropylene. Another suitable class of supports comprises porous organic supports functionalized with groups having active hydrogen atoms. Particularly suitable are those in which the organic support is a partially crosslinked styrene polymer. Supports of this type are described in EP 633 272.

The supportation process is generally carried out in an inert solvent, such as hydrocarbon selected from toluene, hexane, pentane and propane, at a temperature ranging from 0° C. to 100° C.

A particularly suitable process for supporting the catalyst system is described in WO01/44319, wherein the process comprises the steps of:

(a) preparing a catalyst solution comprising a soluble catalyst component;

(b) introducing into a contacting vessel:
  (i) a porous support material in particle form, and
  (ii) a volume of the catalyst solution not greater than the total pore volume of the porous support material introduced;

(c) discharging the material resulting from step (b) from the contacting vessel and suspending it in an inert gas flow, under such conditions that the solvent evaporates; and (d) reintroducing at least part of the material resulting from step (c) into the contacting vessel together with another volume of the catalyst solution not greater than the total pore volume of the reintroduced material.

A preferred class of metallocene compounds are those belonging to the following formulas (I), (II) or (III):

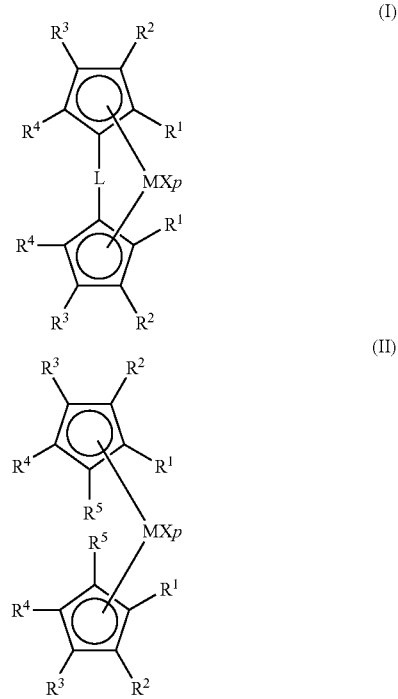

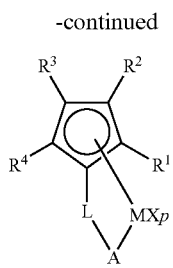
(III)

wherein

M is a transition metal belonging to group 4, 5 or to the lanthanide or actinide groups of the Periodic Table of the Elements; preferably M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl group, optionally containing one or more Si or Ge atoms; the substituents X are preferably the same and are preferably $R^6$, $OR^6$ and $NR^6_2$; wherein $R^6$ is preferably a $C_1$–$C_7$ alkyl, $C_6$–$C_{14}$ aryl or $C_7$–$C_{14}$ arylalkyl group, optionally containing one or more Si or Ge atoms; more preferably, the substituents X are selected from the group consisting of —Cl, —Br, —Me, —Et, -n-Bu, -sec-Bu, —Ph, —Bz, —CH$_2$SiNe$_3$, —OEt, —OPr, —OBu, —OBz and —NMe$_2$;

p is an integer equal to the oxidation state of the metal M minus 2;

L is a divalent bridging group selected from $C_1$–$C_{20}$ alkylidene, $C_3$–$C_{20}$ cycloalkylidene, $C_6$–$C_{20}$ arylidene, $C_7$–$C_{20}$ alkylarylidene, or $C_7$–$C_{20}$ arylalkylidene radicals optionally containing heteroatoms belonging to groups 13–17 of the Periodic Table of the Elements, and silylidene radical containing up to 5 silicon atoms such as SiMe$_2$, SiPh$_2$; preferably L is a divalent group $(ZR^7_m)_n$; Z being C, Si, Ge, N or P, and the $R^7$ groups, equal to or different from each other, being hydrogen or linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl groups or two $R^1$ can form a aliphatic or aromatic $C_4$–$C_7$ ring;

m is 1 or 2, and more specifically it is 1 when Z is N or P, and it is 2 when Z is C, Si or Ge; n is an integer ranging from 1 to 4; preferably n is 1 or 2;

more preferably L is selected from Si(CH$_3$)$_2$, SiPh$_2$, SiPhMe, SiMe(SiMe$_3$), CH$_2$, (CH$_2$)$_2$, (CH$_2$)$_3$ or C(CH$_3$)$_2$;

A is a $NR^8$, O, S radical, wherein $R^8$ is a $C_1$–$C_{20}$ hydrocarbon group optionally containing one or more heteroatoms belonging to groups 13–17 of the Periodic Table of the Elements; preferably $R^8$ is a linear or branched, cyclic or acyclic, $C_1$–$C_{20}$-alkyl, $C_2$–$C_{20}$ alkenyl, $C_2$–$C_{20}$ alkynyl, $C_6$–$C_{20}$-aryl, $C_7$–$C_{20}$-alkylaryl or $C_7$–$C_{20}$-arylalkyl radical optionally containing one or more heteroatoms belonging to groups 13–17 of the Periodic Table of the Elements; more preferably $R^8$ is a tert-butyl radical.

$R^1$, $R^2$, $R^3$, $R^4$ and $R^5$, equal to or different from each other, are hydrogen atoms, halogen atoms or linear or branched, saturated or unsaturated $C_1$–$C_{20}$-alkyl, $C_3$–$C_{20}$-cycloalkyl, $C_6$–$C_{20}$-aryl, $C_7$–$C_{20}$-alkylaryl, or $C_7$–$C_{20}$-arylalkyl radicals, optionally containing one or more heteroatoms belonging to groups 13–17 of the Periodic Table of the Elements; or two adjacent $R^1$, $R^2$, $R^3$, $R^4$ and $R^5$ form one or more 3–7 membered ring optional containing heteroatoms belonging to groups 13–17 of the periodic table; such as to form with the cyclopentadienyl moiety, for example, the following radicals: indenyl; mono-, di-, tri- and tetra-methyl indenyl; 2-methyl indenyl, 3-'butyl-indenyl, 2-isopropyli-4-phenyl indenyl, 2-methyl-4-phenyl indenyl, 2-methyl-4,5 benzo indenyl; 3-trimethylsilyl-indenyl; 4,5,6,7-tetrahydroindenyl; fluorenyl; 5,10-dihydroindeno[1,2-b]indol-10-yl; N-methyl- or N-phenyl-5,10-dihydroindeno [1,2-b]indol-10-yl; 5,6-dihydroindeno[2,1-b]indol-6-yl; N-methyl-or N-phenyl-5,6-dihydroindeno[2,1-b]indol-6-yl; azapentalene-4-yl; thiapentalene-4-yl; azapentalene-6-yl; thiapentalene-6-yl; mono-, di- and tri-methyl-azapentalene-4-yl, 2,5-dimethyl-cyclopenta[1,2-b:4,3-b']-dithiophene.

Non limiting examples of compounds belonging to formula (I) (II) and (M) are the following compounds (when possible in either their meso or racemic isomers, or mixtures thereof):

bis(cyclopentadienyl)zirconium dichloride;
bis(indenyl)zirconium dichloride;
bis(tetrahydroindenyl)zirconium dichloride;
bis(fluorenyl)zirconium dichloride;
(cyclopentadienyl)(indenyl)zirconium dichloride;
(cyclopentadienyl)(fluorenyl)zirconium dichloride;
(cyclopentadienyl)(tetrahydroindenyl)zirconium dichloride;
(fluorenyl)(indenyl)zirconium dichloride;
bis(1-methyl-3-n-butyil-cyclopentadienyl)zirconium dichloride;
dimethylsilanediylbis(indenyl)zirconium dichloride,
dimethylsilanediylbis(2-methyl-4-phenylindenyl)zirconium dichloride,
dimethylsilanediylbis(4-naphthylindenyl)zirconium dichloride,
dimethylsilanediylbis(2-methylindenyl)zirconium dichloride,
dimethylsilanediylbis(2-methyl-4-t-butylindenyl)zirconium dichloride,
dimethylsilanediylbis(2-methyl-4-isopropylindenyl)zirconium dichloride,
dimethylsilanediylbis(2,4-dimethylindenyl)zirconium dichloride,
dimethylsilanediylbis(2-methyl-4,5-benzoindenyl)zirconium dichloride,
dimethylsilanediylbis(2,4,7-trimethylindenyl)zirconium dichloride,
dimethylsilanediylbis(2,4,6-trimethylindenyl)zirconium dichloride,
dimethylsilanediylbis(2,5,6-trimethylindenyl)zirconium dichloride,
methyl(phenyl)silanediylbis(2-methyl-4,6-diisopropylindenyl)-zirconium dichloride,
methyl(phenyl)silanediylbis(2-methyl-4-isopropylindenyl)-zirconium dichloride,
1,2-ethylenebis(indenyl)zirconium dichloride,
1,2-ethylenebis(4,7-dimethylindenyl)zirconium dichloride,
1,2-ethylenebis(2-methyl-4-phenylindenyl)zirconium dichloride,
1,4-butanediylbis(2-methyl-4-phenylindenyl)zirconium dichloride,
1,2-ethylenebis(2-methyl-4,6-diisopropylindenyl)zirconium dichloride,
1,4-butanediylbis(2-methyl-4-isopropylindenyl)zirconium dichloride,
1,4-butanediylbis(2-methyl-4,5-benzoindenyl)zirconium dichloride, 1,2-ethylenebis (2-methyl-4,5-benzoindenyl)zirconium dichloride,
[4-($\eta^5$-cyclopentadienyl)-4,6,6-trimethyl($\eta^5$-4,5-tetrahydropentalene)]dimethylzirconium,
[4-($\eta^5$-3'-trimethylsilylcyclopentadienyl)-4,6,6-trimethyl ($\eta^5$-4,5-tetrahydropentalene)]dimethylzirconium,
(tert-butylamido)(tetramethyl-$\eta^5$-cyclopentadienyl)-1,2-ethane-dimethyltitanium,
(methylamido)(tetramethyl-$\eta^5$-cyclopentadienyl)dimethyl-silyl-dimethyltitanium,
(methylamido)(tetramethyl-5-cyclopentadienyl)-1,2-ethanediyl-dimethyltitanium,
(tertbutylamido)-(2,4-dichloride-2,4-pentadien-1-yl)dimethylsilyl-dimethyltitanium,
bis(1,3-dimethylcyclopentadienyl)zirconium dichloride,
methylene(3-methyl-cyclopentadienyl)-7-(2,5-dimethylcyclopentadienyl-[1,2-b:4,3-b']dithiophene)zirconium dichloride;
methylene(3-isopropyl-cyclopentadienyl)-7-(2,5-dimethyl-cyclopentadienyl-[1,2-b:4,3-b']dithiophene)zirconium dichloride;
methylene(2,4-dichloride-cyclopentadienyl)-7-(2,5-dimethylcyclopentadienyl-[1,2-b:4,3-b']dithiophene)zirconium dichloride;
methylene(2,3,5-trimethyl-cyclopentadienyl)-7-(2,5-dimethylcyclopentadienyl-[1,2-b:4,3-b']dithiophene)zirconium dichloride;
methylene-1-(indenyl)-7-(2,5-dimethylcyclopentadienyl-[1,2-b:4,3-b']dithiophene)zirconium dichloride and dichloride;
methylene-1-(indenyl)-7-(2,5-ditrimethylsilylcyclopentadienyl-[1,2-b:4,3-b']dithiophene)zirconium dichloride;
methylene-1-(3-isopropyl-indenyl)-7-(2,5-dimethylcyclopentadienyl-[1,2-b:4,3-b']dithiophene)zirconium dichloride;
methylene-1-(2-methyl-indenyl)-7-(2,5-dimethylcyclopentadienyl-[1,2-b:4,3-b']dithiophene)zirconium dichloride;
methylene-1-(tetrahydroindenyl)-7-(2,5-dimethylcyclopentadienyl-[1,2-b:4,3-b']dithiophene)zirconium dichloride;
methylene(2,4-dichloride-cyclopentadienyl)-7-(2,5-dimethylcyclopentadienyl-[,2-b:4,3-b']dioxazol)zirconium dichloride;
methylene(2,3,5-trimethyl-cyclopentadienyl)-7-(2,5-dimethylcyclopentadienyl-[1,2-b:4,3-b']dioxazol)zirconium dichloride;
methylene-1-(indenyl)-7-(2,5-dimethylcyclopentadienyl-[1,2-b:4,3-b']dioxazol)zirconium dichloride and dichloride;
isopropylidene(3-methyl-cyclopentadienyl)-7-(2,5-dimethylcyclopentadienyl-[1,2-b:4,3-b']dithiophene)zirconium dichloride;
isopropylidene(2,4-dichloride-cyclopentadienyl)-7-(2,5-dimethylcyclopentadienyl-[1,2-b:4,3-b']dithiophene)zirconium dichloride;
isopropylidene(2,4-diethyl-cyclopentadienyl)-7-(2,5-dimethylcyclopentadienyl-[1,2-b:4,3-b']dithiophene)zirconium dichloride;
isopropylidene(2,3,5-trimethyl-cyclopentadienyl)-7-(2,5-dimethylcyclopentadienyl-[1,2-b:4,3-b']dithiophene)zirconium dichloride;
isopropylidene-1-(indenyl)-7-(2,5-dimethylcyclopentadienyl-[1,2-b:4,3-b']dithiophene)zirconium dichloride;
isopropylidene-1-(2-methyl-indenyl)-7-(2,5-dimethylcyclopentadienyl-[1,2-b:4,3-b']dithiophene)zirconium dichloride;
dimethylsilandiyl-1-(2-methyl-indenyl)-7-(2,5-diniethylcyclopentadienyl-[1,2-b:4,3-b']dithiophene)hafnium dichloride;
dimethylsilanediyl(3-tert-butyl-cyclopentadienyl)(9-fluorenyl)zirconium dichloride,
dimethylsilanediyl(3-isopropyl-cyclopentadienyl)(9-fluorenyl)zirconium dichloride,
dimethylsilanediyl(3-methyl-cyclopentadienyl)(9-fluorenyl)zirconium dichloride,
dimethylsilanediyl(3-ethyl-cyclopentadienyl)(9-fluorenyl)zirconium dichloride,
1-2-ethane(3-tert-butyl-cyclopentadienyl)(9-fluorenyl)zirconium dichloride,
1-2-ethane (3-isopropyl-cyclopentadienyl)(9-fluorenyl)zirconium dichloride,
1-2-ethane (3-methyl-cyclopentadienyl)(9-fluorenyl)zirconium dichloride,
1-2-ethane (3-ethyl-cyclopentadienyl)(9-fluorenyl)zirconium dichloride,
dimethylsilandiylbis-6-(3-methylcyclopentadienyl-[1,2-b]-thiophene) dichloride;
dimethylsilandiylbis-6-(4-methylcyclopentadienyl-[1,2-b]-thiophene)zirconium dichloride;
dimethylsilandiylbis-6-(4-isopropylcyclopentadienyl-[1,2-b]-thiophene)zirconium dichloride;
dimethylsilandiylbis-6-(4-ter-butylcyclopentadienyl-[1,2-b]-thiophene)zirconium dichloride;
dimethylsilandiylbis-6-(3-isopropylcyclopentadienyl-[1,2-b]-thiophene)zirconium dichloride;
dimethylsilandiylbis-6-(3-phenylcyclopentadienyl-[1,2-b]-thiophene)zirconium dichloride;
dimethylsilandiylbis-6-(2,5-dichloride-3-phenylcyclopentadienyl-[1,2-b]-thiophene)zirconium di methyl;
dimethylsilandiylbis-6-[2,5-dichloride-3-(2-methylphenyl) cyclopentadienyl-[1,2-b]-thiophene]zirconium dichloride;
dimethylsilandiylbis-6-[2,5-dichloride-3-(2,4,6-trimethylphenyl)cyclopentadienyl-[1,2-b]-thiophene]zirconium dichloride;
dimethylsilandiylbis-6-[2,5-dichloride-3-mesitylenecyclopentadienyl-[,2-b]-thiophene]zirconium dichloride;
dimethylsilandiylbis-6-(2,4,5-trimethyl-3-phenylcyclopentadienyl-[1,2-b]-thiophene)zirconium dichloride;
dimethylsilandiylbis-6-(2,5-diethyl-3-phenylcyclopentadienyl-[1,2-b]-thiophene)zirconium dichloride;
dimethylsilandiylbis-6-(2,5-diisopropyl-3-phenylcyclopentadienyl-[1,2-b]-thiophene)zirconium dichloride;
dimethylsilandiylbis-6-(2,5-diter-butyl-3-phenylcyclopentadienyl-[1,2-b]-thiophene)zirconium dichloride;
dimethylsilandiylbis-6-(2,5-ditrimethylsilyl-3-phenylcyclopentadienyl-[1,2-b]-thiophene)zirconium dichloride;
dimethylsilandiylbis-6-(3-methylcyclopentadienyl-[1,2-b]-silole)zirconium dichloride;
dimethylsilandiylbis-6-(3-isopropylcyclopentadienyl-[1,2-b]-silole)zirconium dichloride;
dimethylsilandiylbis-6-(3-phenylcyclopentadienyl-[1,2-b]-silole)zirconium dichloride;
dimethylsilandiylbis-6-(2,5-dichloride-3-phenylcyclopentadienyl-[1,2-b]-silole)zirconium dichloride;
dimethylsilandiylbis-6-[2,5-dichloride-3-(2-methylphenyl) cyclopentadienyl-[1,2-b]-silole]zirconium dichloride;
dimethylsilandiylbis-6-[2,5-dichloride-3-(2,4,6-methylphenyl)cyclopentadienyl-[1,2-b]-silole]zirconium dichloride;
dimethylsilandiylbis-6-[2,5-dichloride-3-mesitylenecyclopentadienyl-[1,2-b]-silole]zirconium dichloride;
dimethylsilandiylbis-6-(2,4,5-trimethyl-3-phenylcyclopentadienyl-[1,2-b]-silole)zirconium dichloride;
[dimethylsilyl(tert-butylamido)][tetramethylpentadienyl]titanium dichloride;

[dimethylsilyl(tert-butylamido)][1-indenyl]titanium dichloride;
[dimethylsilyl(tert-butylamido)][9-fluorenyl]titanium dichloride;
[dimethylsilyl(tert-butylamido)][(N-methyl-1,2-dihydrocyclopenta[2,1-b]indol-2-yl)]titanium dichloride;
[dimethylsilyl(tert-butylamido)][(6-methyl-N-methyl-1,2-dihydrocyclopenta[2,1-b]indol-2-yl)]titanium dichloride;
[dimethylsilyl(tert-butylamido)][(6-methoxy-N-methyl-1,2-dihydrocyclopenta[2,1-b]indol-2-yl)]titanium dichloride;
[dimethylsilyl(tert-butylamido)][(N-ethyl-1,2-dihydrocyclopenta[2,1-b]indol-2-yl)]titanium dichloride;
[dimethylsilyl(tert-butylamido)][(N-phenyl-1,2-dihydrocyclopenta[2,1-b]indol2-yl)]titanium dichloride;
[dimethylsilyl(tert-butylamido)][(6-methyl-N-phenyl-1,2-dihydrocyclopenta[2,1-b]indol2-yl)]titanium dichloride;
[dimethylsilyl(tert-butylamido)][(6-methoxy-N-phenyl-1,2-dihydrocyclopenta[2,1-b]indol2-yl)]titanium dichloride;
[dimethylsilyl(tert-butylamido)][(N-methyl-3,4-dichloride-1,2-dihydrocyclopenta[2,1-b]indol-2-yl)]titanium dichloride;
[dimethylsilyl(tert-butylamido)][(N-ethyl-3,4-dichloride-1,2-dihydrocyclopenta[2,1-b]indol-2-yl)]titanium dichloride;
[dimethylsilyl(tert-butylamido)][(N-phenyl-3,4-dichloride-1,2-dihydroclopenta[2,1-b]indol-2-yl)]titanium dichloride;
Dimethylsilandiylbis(2-methyl-4-p-tert-butylphenylindenyl)zirconium dichloride;
Dimethylsilandiyl(2-isopropyl-4-p-tert-butylphenylindenyl)(2-methyl-4-p-tert-butylphenylindenyl)zirconium dichloride;
Dimethylsilandiyl(2-isopropyl-4-p-tert-butylphenylindenyl)(2-methyl-4-p-tert-butyl-7-methylphenylindenyl)zirconium dichloride;

as well as the corresponding zirconium dimethyl, hydrochloro dihydro and η$^4$-butadiene compounds.

Suitable metallocene complexes belonging to formulas (I), (II) or (III) are described in WO 98/22486, WO 99/58539 WO 99/24446, U.S. Pat. No. 5,556,928, WO 96/22995, EP-485822, EP-485820, U.S. Pat. No. 5,324,800, EP-A-0 129 368, U.S. Pat. No. 5,145,819, EP-A-0 485 823, WO 01/47939, WO 01/44318, PCT/EP02/13552, EP-A-0 416 815, EP-A-0 420 436, EP-A-0 671 404, EP-A-0 643 066 and WO-A-91/04257.

Alumoxanes used as component b) can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$–$C_{20}$-alkyl, $C_3$–$C_{20}$-cyclalkyl, $C_6$–$C_{20}$-aryl, $C_7$–$C_{20}$-alkylaryl or $C_7$–$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The molar ratio between aluminium and the metal of the metallocene is generally comprised between about 10:1 and about 30000:1, preferably between about 100:1 and about 5000:1.

The alumoxanes used in the catalyst according to the invention are considered to be linear, branched or cyclic compounds containing at least one group of the type:

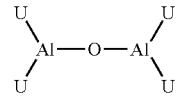

wherein the substituents U, same or different, are defined above.

In particular, alumoxanes of the formula:

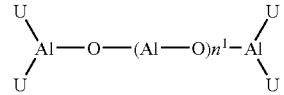

can be used in the case of linear compounds, wherein $n^1$ is 0 or an integer of from 1 to 40 and the substituents U are defined as above; or alumoxanes of the formula:

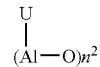

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminiun, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminum, tris(2,3,3-triethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminum, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl]aluminum, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl)aluminium (TDMBA) and tris(2,3,3-trimethylbutyl) aluminium (TTMBA) are preferred. Particularly interesting cocatalysts are also those described in WO 00/24787. Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniurntetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylanunoniumtetra(pentafluorophenyl)aluminate,
Tripropylammoniumtetra(dimethylphenyl)borate,
Tributylammoniumtetra(trifluoromethylphenyl)borate,
Tributylamnoniumtetra(4-fluorophenyl)borate,
N,N-Dimethylbenzylarunoniumtetrakis(pentafluorophenyl) borate,
N,N-Dimethylcyclohexylamoniumtetrakis(pentafluorophenyl)borate,
N,N-Dimethylaniliniumtetra(phenyl)borate,
N,N-Diethylaniliniumtetra(phenyl)borate,
N,N-Dimethylaniliniumtetrakispentafluorophenyl)borate,
N,N-Dimethylaniliniumtetrakis(pentafluorophenyl)aluminate,
N,N-Dimethylbenzylammonium-tetrakispentafluorophenyl aluminate,
N,N-Dimethylcyclohexylamonium-tetrakispentafluorophenyl aluminate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniuntetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate and
Triphenylcarbeniumtetrakis(pentafluorophenyl)borate.

Organic aluminum compounds used as compound c) are those of formula $H_jAlU_{3-j}$ or $H_jAl_2U_{6-j}$ as described above.

Besides in prepolymerization, a molecular weight regulator, such as hydrogen, can also be used in the polymerization reactor.

The process according to the present invention will be illustrated with reference to the following drawings.

Figure 2:
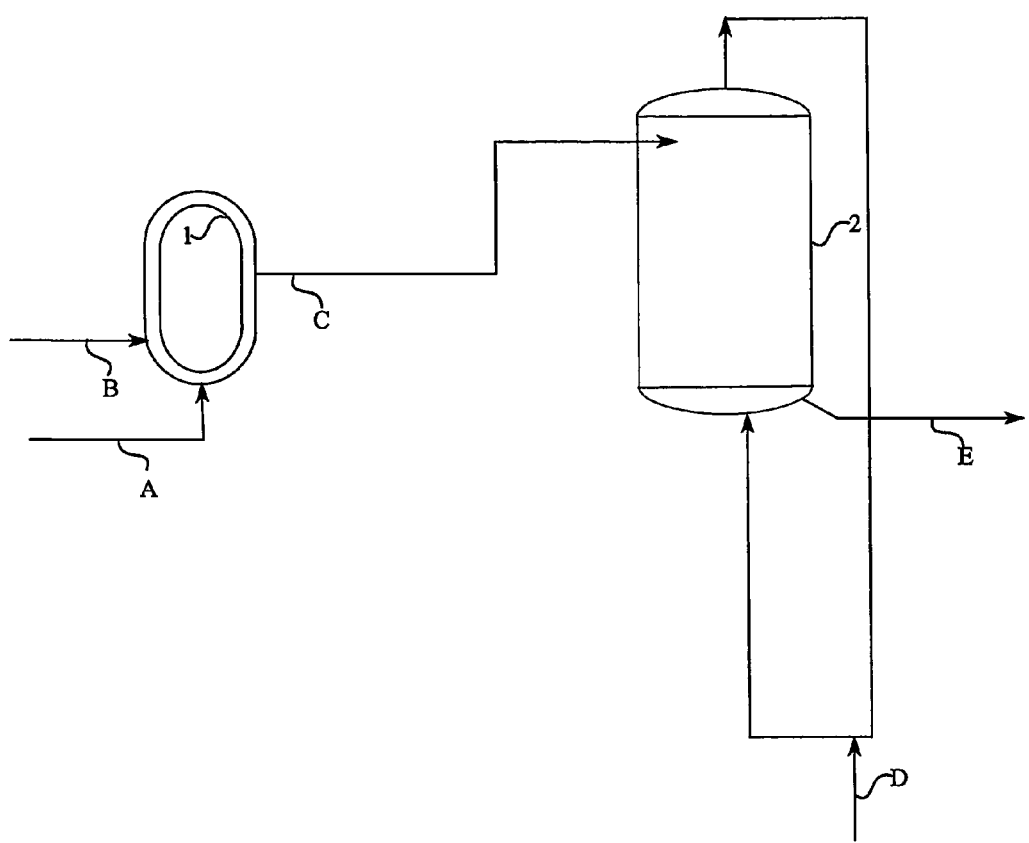
Figure 3:
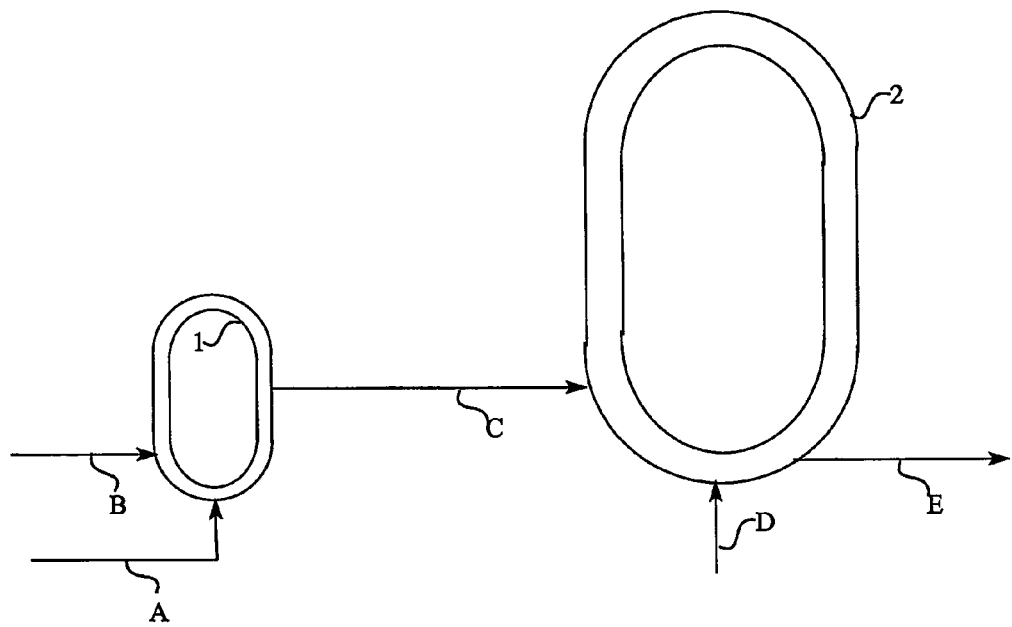

FIGS. 1, 2 and 3 show diagrammatically three embodiments of the process according to the present invention.

Referring to FIG. 1, the metallocene-based catalyst system is fed to the loop prepolymerization reactor 1 through line A. The monomers are fed to the loop reactor through line B. The catalyst-prepolymer product is transferred to separator 2 via line C and then via line D to the gas-phase reactor 3 that can be a fluidized bed reactor or a stirred reactor. Monomers are fed to the polymerization reactor through line E and the obtained polymer is withdrawn through line F. Polymer exiting the reactor from line F can be fed to a second polymerization reactor before being separated from the unreacted monomers and purified.

Referring to FIG. 2 the metallocene-based catalyst system is fed to the loop prepolymerization reactor 1 through line A. The monomers are fed to the loop reactor through line B. The catalyst-prepolymer product is transferred via line C to the gas-phase reactor 2 that can be a fluidized bed reactor or a stirred reactor. Monomers are fed to the polymerization reactor through line D and the obtained polymer is withdrawn through line E. Polymer exiting the reactor from line E can be fed to a second polymerization reactor before being separated from the unreacted monomers and purified.

Referring to FIG. 3, the metallocene-based catalyst system is fed to the loop prepolymerization reactor 1 through line A. The monomers are fed to the loop reactor through line B. The catalyst-prepolymer product is transferred to the loop polymerization reactor 2 via line C. Monomers are fed to the loop reactor through line D and the obtained polymer is withdrawn through line E. Polymer exiting the reactor from line E can be fed to a second polymerization reactor before being separated from the unreacted monomers and purified.

The following examples are given to illustrate and not to limit the invention.

EXAMPLES

Preparation of the Catalyst System 3 kg of silica (Sylopol 948™) is loaded in a process filter whose filter plate points upward, and suspended in 15 L of toluene. While stirring 7 L of a 30% strength by weight MAO solution in toluene are metered in such a rate that the internal temperature does not exceed 35° C. After stirring for another 1 hour at a low stirrer speed, the process filter is turned that its filtration plate points downwards, the suspension is filtered, firstly under atmospheric pressure and then using 3 bar of nitrogen pressure. In parallel to the treatment of the support material, 2.0 L of 30% strength by weight MAO solution and 92.3 g of rac-dimethylsilylbis(2-methyl- 4,5-benzo-indenyl)-zirconium dichloride are placed in a reaction vessel, the solution is stirred for 1 hour and allowed to settle for a further 30 minutes. The solution is subsequently added to the pretreated support material with the outlet closed. After addition is complete, the outlet is opened and the filtrate is allowed to drain. When no more liquid runs off, the outlet is closed, the filter cake is stirred for 15 minutes and allowed to rest for 1 hour. A nitrogen pressure of 3 bar is subsequently applied with the outlet open. 15 L of isododecane are added to the remaining solid, the mixture is stirred for 15 minutes and filtered. The washing step is repeated with heptane instead of isododecane, and the solid is subsequently pressed dry by means of a nitrogen pressure. By application of vacuum solvent residues are condensed until a free flowing catalyst powder is received.

The metallocene-based catalyst system so obtained is suspended in a mixture of oil/grease so that to have a catalyst concentration of 200 g of catalyst per 1 liter of mud.

Propylene Polymerization General Procedure

The catalyst system in the form of catalyst mud obtained as described above is fed in the precontact vessel in which it is diluted with about 5 (Kg/h) of propane. From the pre-contact vessel the catalyst system is fed to the prepolymerization loop in which propylene and hydrogen (when present) are fed at the same time according to the data reported in table 1. The residence time of the catalyst in the loop is about 8 minutes. The prepolymerized catalyst obtained in the prepolymerization loop is then continuously feed into the first loop reactor and subsequently the obtained polymer is fed to the second reactor (data are reported in table 2). The polymer is discharged from the second reactor, separated from the unreacted monomer and dried.

TABLE 1

| Run | Prepolymerization temperature (° C.) | Hydrogen (ppm) | Yield of prepolymerized Catalyst (g/g cat) |
| --- | --- | --- | --- |
| 1* | 20 | 0 | <30 |
| 2* | 20 | 180 | <40 |
| 3 | 30 | 180 | 96 |
| 4 | 30 | 0 | 78 |
| 6 | 40 | 180 | 129 |
| 7 | 40 | 0 | 115 |
| 8 | 50 | 180 | 145 |

*comparative

TABLE 2

| | First reactor | | Second reactor | | |
| --- | --- | --- | --- | --- | --- |
| Run | Propylene (Kg/h) | $H_2$ (ppm) | Propylene (Kg/h) | $H_2$ (ppm) | Notes |
| 1* | 400 | 0 | 130 | 0 | Fouling |
| 2* | 400 | 180 | 130 | 180 | Fouling |
| 3 | 400 | 180 | 130 | 180 | no-fouling |
| 4 | 400 | 0 | 130 | 0 | no-fouling |
| 5 | 400 | 180 | 130 | 180 | no-fouling |
| 6 | 400 | 0 | 130 | 0 | no-fouling |
| 7 | 400 | 180 | 130 | 180 | no-fouling |

*comparative

The invention claimed is:

1. A process for polymerizing at least one alpha-olefin comprising:
   continuously contacting at least one alpha-olefin with a metallocene-based catalyst system in a loop reactor at a temperature ranging from 25° C. to 70° C., wherein
   (i) the alpha-olefin and metallocene-based catalyst system is in a liquid medium; and
   (ii) an average residence time of the metallocene-based catalyst system is not more than 30 minutes;
   obtaining a prepolymerized metallocene-based catalyst system comprising a polymerization degree ranging from 60 to 500 g per gram of the metallocene-based catalyst system;
   continuously feeding the prepolymerized metallocene-based catalyst system into a polymerization reactor;
   polymerizing at least one alpha-olefin with the prepolymerized metallocene-based catalyst system.

2. The process according to claim 1, wherein the continuously contacting at least one alpha-olefin with the metallocene-based catalyst system in the loop reactor at a temperature ranging from 25° C. to 70° C. further comprises hydrogen.

3. The process according to claim 2, wherein the hydrogen is in the loop reactor, and the hydrogen ranges from 5 to 1000 ppm.

4. The process according to claim 1, wherein the average residence time is not more than 20 minutes.

5. The process according to claim 1, wherein the polymerization degree ranges from 70 to 300 g per gram of the metallocene-based catalyst system.

6. The process according to claim 1, wherein the temperature ranges from 30° C. to 65° C.

7. The process according to claim 1, wherein the metallocene-based catalyst system is obtained by contacting:
   a) at least one transition metal compound containing at least one n bond;
   b) at least one alumoxane or a compound able to form an alkylmetallocene cation; and
   c) optionally an organo aluminum compound.

8. The process according to claim 7, wherein the metallocene-based catalyst system is supported on an inert carrier.

9. The process according to claim 1, wherein the continuously contacting at least one alpha-olefin with the metallocene-based catalyst system at a temperature ranging from 25° C. to 70° C. is carried out in a first loop reactor, with the prepolymerized metallocene-based catalyst system transferred to a separator via a first line, with the prepolymerized metallocene-based catalyst system then transferred via a second line to a gas-phase reactor with a polymer withdrawn through a final line.

10. The process according to claim 1, wherein the continuously contacting at least one alpha-olefin with the metallocene-based catalyst system at a temperature ranging from 25° C. to 70° C. is carried out in a first loop reactor, with the prepolymerized metallocene-based catalyst system transferred via a first line, to a gas-phase reactor with a polymer withdrawn through a second line.

11. The process according to claim 1, wherein the continuously contacting at least one alpha-olefin with the metallocene-based catalyst system at a temperature ranging from 25° C. to 70° C. is carried out in a first loop reactor, with the prepolymerized metallocene-based catalyst system transferred to a loop polymerization reactor via a first line with a polymer withdrawn through a discharge line.

12. The process according to claim 1, wherein the polymerizing of at least one alpha-olefin with the prepolymerized metallocene-based catalyst system is carried out in one or more reactors connected in series.

13. The process according to claim 1, wherein at least one alpha-olefin of formula $CH_2=CHT$ is polymerized, wherein T is hydrogen or a $C_1$–$C_{20}$ alkyl radical.

14. The process according to claim 13, wherein at least one polyene is homopolymerized or copolymerized.

15. The process according to claim 13, wherein propylene is homopolymerized.

16. The process according to claim 13, wherein propylene is copolymerized with ethylene or with at least one alpha olefin of formula $CH_2\!\!=\!\!CHT^1$, wherein $T^1$ is a $C_2$–$C_{20}$ alkyl radical.

17. The process according to claim 16, wherein propylene is polymerized with at least one polyene.

18. The process according to claim 16, wherein propylene and ethylene are copolymerized.

* * * * *